(12) United States Patent
Davis

(10) Patent No.: US 7,454,237 B1
(45) Date of Patent: Nov. 18, 2008

(54) PRESSURE SENSITIVE ALPHANUMERIC TELEPHONE KEYS

(75) Inventor: Kristopher J. Davis, Lawrence, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 108 days.

(21) Appl. No.: 10/972,997

(22) Filed: Oct. 25, 2004

(51) Int. Cl.
*H04B 1/38* (2006.01)
*H04M 1/00* (2006.01)

(52) U.S. Cl. .................... 455/566; 455/403; 455/414.1; 455/418; 455/550.1

(58) Field of Classification Search .................. 455/418, 455/419, 466, 550.1, 556.2, 403, 414.1, 566; 345/168, 169, 156; 341/22, 23
See application file for complete search history.

(56) References Cited

U.S. PATENT DOCUMENTS

| | | | |
|---|---|---|---|
| 6,184,803 B1 * | 2/2001 | Burrell, IV | 341/22 |
| 6,286,064 B1 * | 9/2001 | King et al. | 710/67 |
| 6,381,468 B1 | 4/2002 | Larsen et al. | |
| 6,765,556 B2 * | 7/2004 | Kandogan et al. | 345/168 |
| 6,885,318 B2 * | 4/2005 | Bickerton | 341/22 |
| 6,919,824 B2 * | 7/2005 | Lee | 341/20 |
| 6,980,200 B2 * | 12/2005 | Goren | 345/169 |
| 2002/0027549 A1 * | 3/2002 | Hirshberg | 345/168 |
| 2002/0063687 A1 * | 5/2002 | Kim | 345/160 |
| 2002/0097227 A1 * | 7/2002 | Chu et al. | 345/168 |
| 2004/0070567 A1 * | 4/2004 | Longe et al. | 345/156 |
| 2004/0080487 A1 * | 4/2004 | Griffin et al. | 345/156 |

* cited by examiner

*Primary Examiner*—Stephen M D'Agosta

(57) ABSTRACT

Electronic devices such as mobile telephones including an alphanumeric keypad and at least one shift key and methods for using the alphanumeric keypad and the at least one shift key to display and transmit characters over a wireless network using no more than two key strokes.

16 Claims, 3 Drawing Sheets

PRESSURE SENSITIVE ALPHANUMERIC TELEPHONE KEYS

BACKGROUND OF THE INVENTION (1) Field of the Invention

This invention is directed to electronic devices such as mobile telephones including an alphanumeric keypad and at least one shift key. This invention is also directed to methods for using the alphanumeric keypad and the at least one shift key to display and/or transmit non-numeric characters over a wireless network using only one or two key strokes.

(2) Description of the Art

Most cell phones have alphanumeric keypads that use numbered keys to select characters, such as letters. Each numbered key—except for the numbered keys 0 and 1—are associated with three, and in the case of the keys numbered 7 and 9, with four alphabet characters.

Alphabet characters are selected by cell phone users for many purposes including, but not limited to entering names into an electronic phone books stored in cell phone memory, text messaging, gaming, and so forth. Alphabet characters are typically selected using the numeric keypad by placing the numeric keypad in alphabet mode and thereafter depressing a number key once, twice, or three times to select one of the three or more alphabet characters designated by the number key. The selected alphabet character is then visible on the telephone display and can be transmitted to a receiving device over a wired or a wireless network.

For example, the number 2 on a cell phone designates the letters "A", "B" and "C". To select the letter "C", the user would, in alphabet mode, depress the number 2 key three times in succession. The first time the 2 key is depressed, the screen displays the letter "A". The second time the 2 key is depressed, the screen displays the letter "B" and the third time the 2 key is depressed, the screen displays the letter "C". This character selection process is performed repeatedly in order to spell names, draft messages and so forth.

Pressing a single number key up to three times or more to select a single alphabet character is time consuming and it can cause finger fatigue during activities that require the selection of a large amount of text, such as during text messaging. There is a need, therefore, for methods and apparatuses that reduce the number of key strokes necessary to select alphabet characters using an alphanumeric keypad.

SUMMARY OF THE INVENTION

One aspect of this invention is an apparatus for selecting characters for displaying and/or transmission comprising: a keypad including a plurality of number keys each key displaying a numeral ranging from 0 to 9 wherein at least one number key is capable of designating at least three different non-numeric characters; a display; and a first shift key wherein one of the at least three different characters is selected for display by activating the at least one number key in combination with the first shift key.

Another aspect of this invention is a mobile telephone comprising: a housing; a keypad located in the housing including a plurality of number keys wherein at least one number key is used to select at least three different characters; a display located in the housing; a first shift key; and a second shift key wherein one of the at least three different characters is selected by activating the at least one number key in combination with a key selected from the first shift key and the second shift key.

Still another aspect of this invention includes a method for selecting a non-numeric character comprising the step of: providing a mobile phone that includes a housing, a keypad located in the housing including a plurality of number keys wherein at least one number key is used to select at least three different non-numeric characters, a display located in the housing and at least one shift key; activating a number key; activating the at least one shift key to select one of the at least three different characters; and displaying the selected character on the display.

DESCRIPTION OF THE CURRENT EMBODIMENT

The present invention relates to electronic devices such as mobile telephones having an alphanumeric keypad and at least one shift key. The invention also relates to methods for using the numeric keypad and the at least one shift key to select, for displaying and/or transmission, one of three or more characters designed by a single number key using no more than two key strokes.

Figure 1:
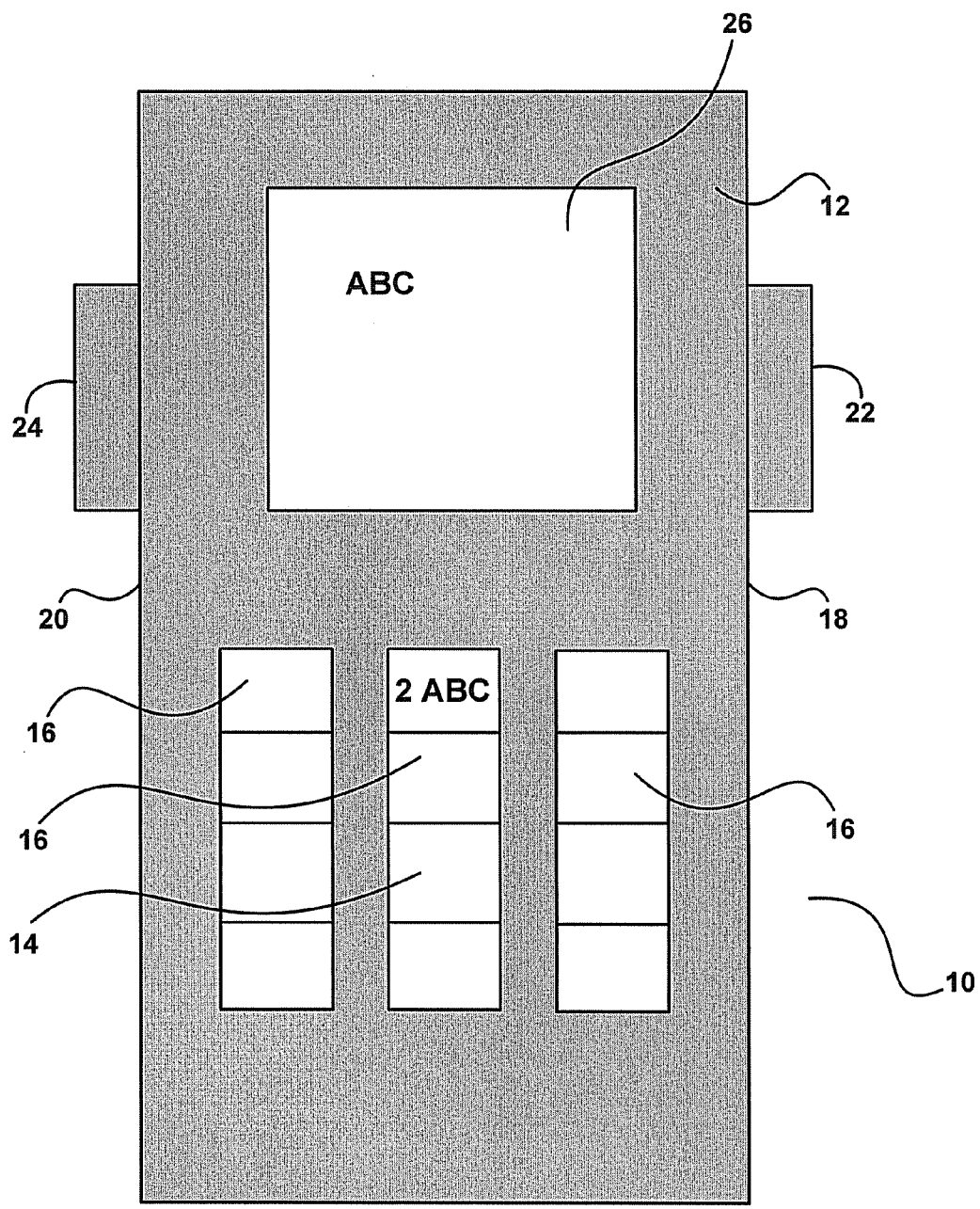
FIG. 1 depicts a mobile telephone embodiment of this invention.

FIG. 1 represents one mobile telephone embodiment of this invention. Mobile telephone 10 includes housing 12 including a first side 18 and a second side 20. An alphanumeric keypad 14 is associated with the housing face. Alphanumeric keypad 14 includes a plurality of individual number keys 16. A preferred keypad layout is described in more detail with reference to FIG. 2 below. Housing 12 further includes a display 26 for displaying alphanumeric information such as incoming and outgoing telephone numbers, telephone logs, telephone book entries, text messages, game information and so forth.

Mobile phone 10 includes a first shift key 22 and an optional second shift key 24. Shift keys 22 and 24 may be located anywhere on mobile phone housing that will make them useful to the user when the mobile phone is in a user's hand. For example, first and second shift keys 22 and 24 may be associated with the front of housing 12. Alternatively shift keys 22 and 24 can both be associated with the first side 28 or the second side 20 of housing 12. It is preferred that first and second shift keys 22 and 24 are positioned on housing 12 in a location that makes them easy to manipulate with one hand. One preferred location finds first and second shift keys 22 and 24 associated with opposing first and second housing sides 18 and 20 as shown in FIG. 1. This orientation of first and second shift keys 22 and 24 allows the user to place the mobile telephone in the palm of his or her hand such that first shift key 22 and second shift key 24 can be depressed with the thumb and index finger on the hand while grasping the phone. Moreover, this orientation of first and second shift keys 22 and 24 allows the user to continuously activate one or both of the shift keys while selecting different alphabet characters.

Figure 2:
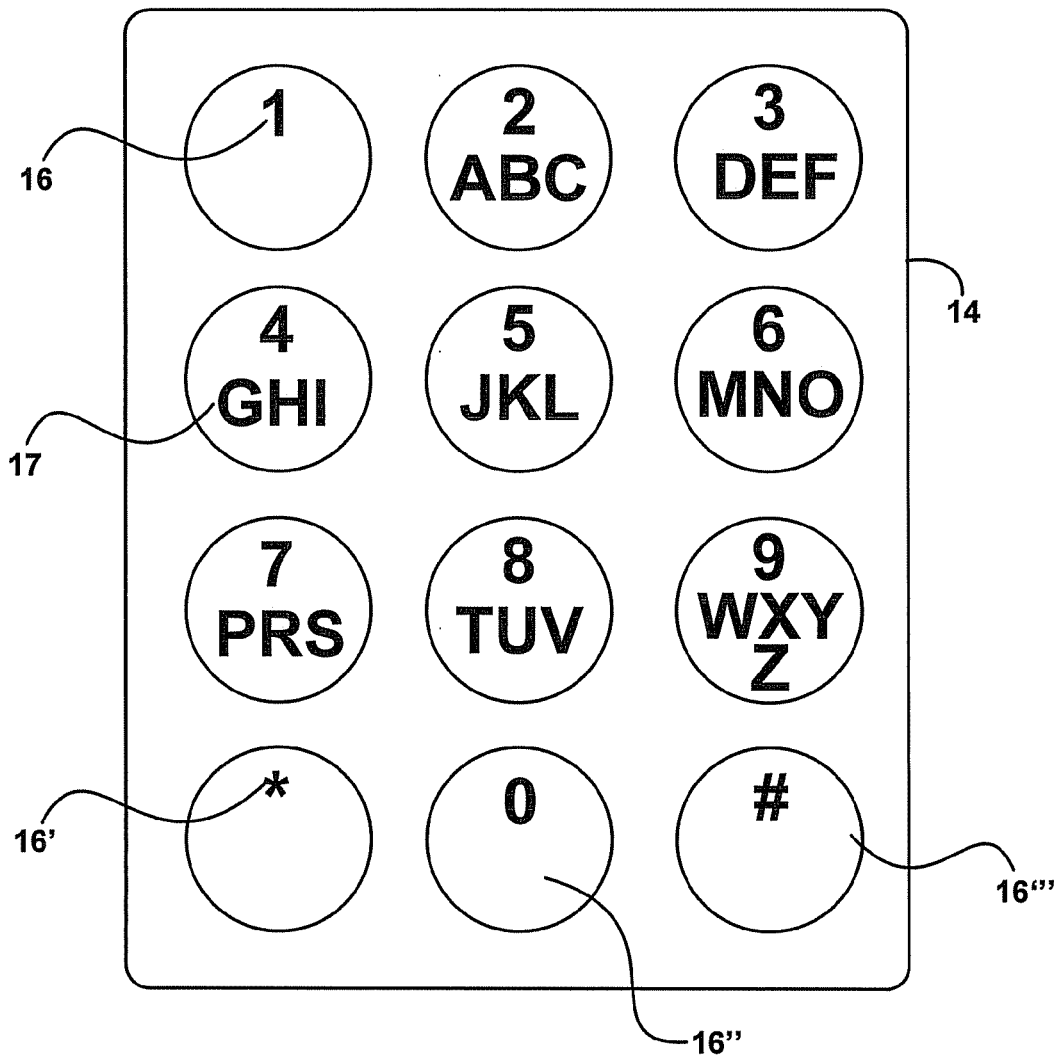
FIG. 2 is an embodiment of a numeric keypad that may be associated with a mobile telephone embodiment of this invention.

A typical alphanumeric keypad 14 layout for a mobile telephone is shown in FIG. 2. Keypad 14 includes a plurality of keys arranged in an array of four rows and three columns. Keys 16, in rows 1, 2 and 3 are number keys that are numbered consecutively 1 through 9. Key 16' in the first column of the fourth row is the asterisk (*) key. Middle key 16" in the fourth row represents zero (0). Finally, the right most key 16''' in the fourth row is the pound (#) key. Number keys labeled 2-9 are typically used to select alphabet characters 17. For purposes of this invention, the alphabet characters associated with each number key is not critical. Thus, for example, the number 1 key can be used instead of the number 2 key to select the letters A, B and C. What is important is that at least one of the number keys 16 designates and is used in the selection, for display and/or transmission, of at least three alphabet characters.

In one aspect of this invention, the maximum number of keystrokes necessary to select each of three characters designated by a single number key is limited to two by the use of the number key 16 in conjunction with at least the first shift key 22, and preferably in conjunction with the use of a first shift key 22 and a second shift key 24. The term "character" is used broadly herein to encompass all non-numeric characters including, but not limited to alphabet characters, punctuation marks, mathematical characters and so forth. Shift keys 22 and 24 differ from conventional shift keys in that they are not used to shift between upper and lower case letters. Therefore the term "character" may encompass either upper or lower case letters but the choice of upper or lower case letters is not made solely with shift keys 22 and 24. Characters, preferably letters, are electronically selected for display and transmission using a number key 16 and at least one shift key by activating a combination of the two keys to select each of the three characters.

Number keys and first and second shift keys may be activated as that term is used in the specification by a number of different methods. The term "activation" includes sequential key strokes such as activating a shift key followed by activation of a number key or vise versa. Alternatively, activation includes activating and maintaining the activation of a key such as a shift key followed by activation of a number key. In one alternative embodiment, the shift key may be activated, by, for example, pressing the shift key after which the shift key will remain activated until it is pressed again. In another alternative embodiment, the shift key can be pressed one after which the character associated with the next activated key stroke is displayed or transmitted and the character associated with a subsequently activated key will not be recognized. In yet another embodiment, the shift key can be pressed twice in succession to continuously activate the shift key. In this embodiment, the character of every subsequently activated number key would be displayed and/or transmitted until the shift key is pressed again to de-activate the shift key.

A key may become activated by a number of different methods. The keys may be pressure sensitive in which case pressing on the key will cause the key to be activated. Alternatively, the key can be a touch screen on which a facsimile of the numeric and/or shift keys is depicted. In this case, the keys would be selected using a stylus or some other input mechanism. This invention contemplates that other methods such as voice commands, eye commands and so forth may be used to select the numeric and/or shift keys.

Figure 3:
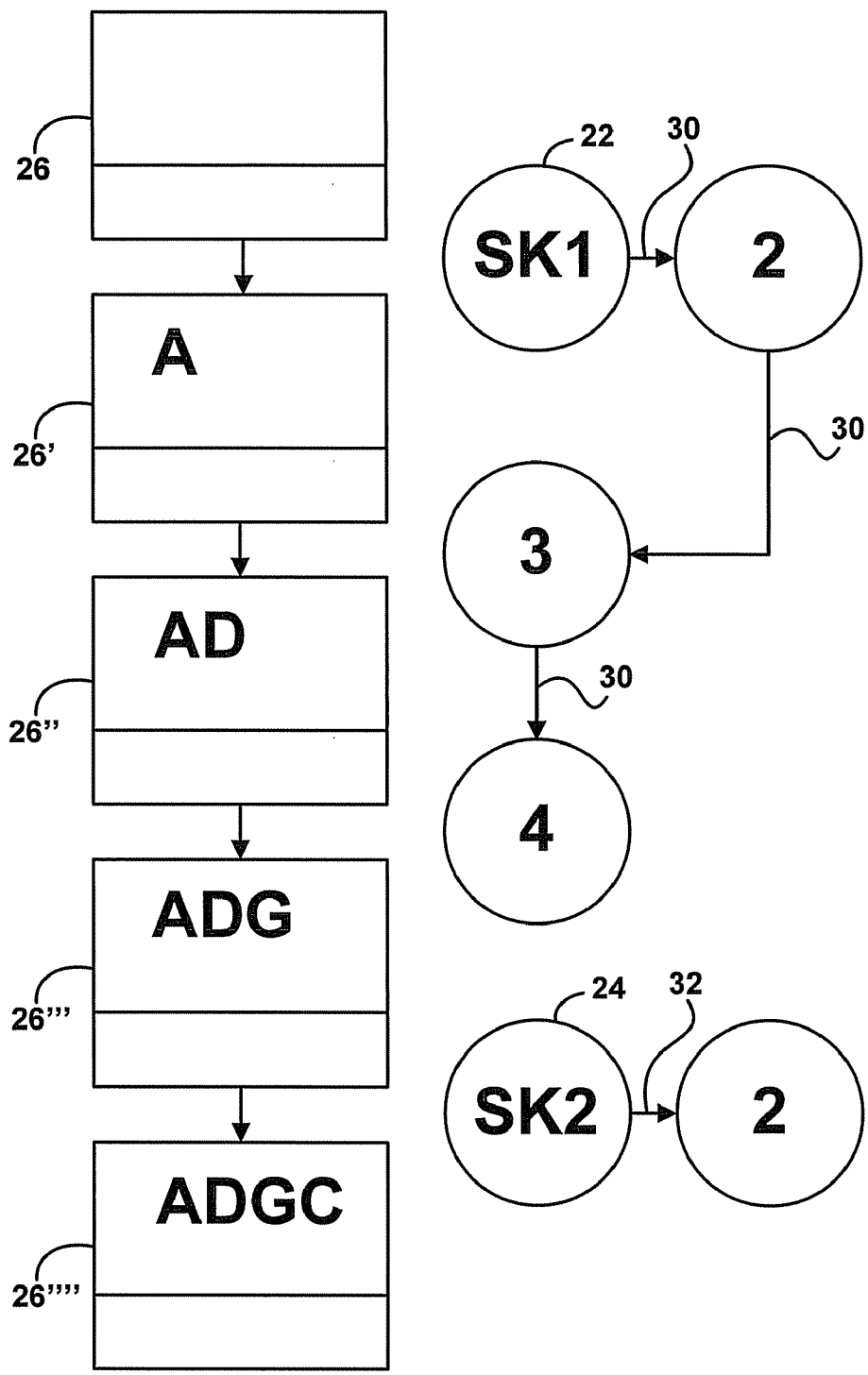
FIG. 3 is a schematic of a method embodiment of this invention for selecting alphabet characters using mobile phone embodiments of this invention.

In one embodiment, this invention encompasses devices having a single shift key. In this embodiment, each of the letters A, B, and C can be selected for example, using keypad 16 of FIG. 2 according to the flow diagram of FIG. 3 by activating the following sequence of keystrokes: the letter A can be selected and displayed on display 26 by activating the number 2 key followed by activation of the first shift key (SK1). The letter C is selected and displayed by activating the number 2 key followed by activation of the second shift key (SK2). Finally, the letter B can be selected and displayed in display 26''' by activating the number 2 key once without activation of either shift key.

The letters that are selected and displayed by each of the three sequences of keystrokes described above can be altered without departing from the scope of this invention. Thus, a single activation of the number 2 key can be used to select the letter B or the letter A instead of the letter C. Also, the sequence of activation—activating the number 2 key followed by activating a shift key can be reversed such that the character is selected by first activating the shift key followed by activating the appropriate number key In a preferred embodiment, mobile telephones of this invention will include a first shift key 22 and a second shift key 24 wherein each shift key is used in conjunction with number key to select one of at least three characters selectable by a single number key. It is also preferred that first and second shift keys 22 and 24 are in a state of activation when a subsequent number key is pressed to designate a character. In this preferred embodiment, more than one character can be selected during a single continuous activation of first or second shift key 22 or 24. According to this preferred embodiment, the shift key remains activated while the appropriate numeral key(s) is being activated. For example, as shown in Table 1 below and in FIG. 3, activating, 30, first shift key 22 followed by activating number key 2 selects and displays (26') the letter A. The letters D and G can be selected and displayed (26" and 26''') without deactivating first shift key 22 by activating number keys 3 and 4 sequentially. This method allows the user to select more than one character during a single activation of first shift key or second shift key 2.

Other methods of this invention for selecting characters using a combination of shift keys and number keys are set forth in Tables 2-6 below. In Tables 2-6, the first two columns identify the key being activated. As discussed above, the first key being activated whether it be a number key or a shift key can be continuously activated in which case second and subsequent characters can be designated using by a single activation of a number key or a shift key. Referring once again to number key 2 of FIG. 2, and to Table 1 below, the letter A is selected by activating shift key 1 followed by activating the number 2 key. Similarly, the letters C and F and I are selected by activating shift key 2 followed by sequential activation of number key 2, 3 and 4 respectively. Finally, the letters B, E and H are selected by single activation of the number key 2, 3 or 4 respectively The combinations of keystrokes (activations) necessary to select a character is not critical. What is important, however, is that no more than two keystrokes (key activations) are necessary to select at least one of three or more characters represented by a single number key. For example, Table 2 below lists a combination of keystrokes that may be used as an alternative to the keystrokes listed in Table 1 for designating the same alphabet characters selected using the Table 1 keystroke combinations. Moreover, the order in which the number key and shift keys are activated is also not critical. Tables 3 and 4 demonstrate further alternative combinations of keystrokes that are useful for selecting alphabet characters when the number key is activated before the shift key.

It is preferred that a shift key is depressed first in any two key sequence for selecting an alphabet character. By activating the shift key first, it is possible to designate multiple characters by a single activation of a plurality of subsequently activated number keys. Moreover, by activating a shift key first, there is no need to design a delay into the system for entering of the next keystroke because the second number keystroke or selection will always designate a particular character. In this embodiment, if the number key is activated first, then the keypad will automatically associate and display a character without activating a second key. This is not the case when the number key is activated before the shift keys as shown in the sequences of Tables 4 and 5. When the number key is activated first, then it is likely, but not always the case that there will be a second shift key selection. Therefore, there must be a delay after pressing a number key, in this embodiment, to allow the user to activate a first or second shift key to select an alphabet character. This delay can slow down text messaging.

It is also preferred that the shift key 22 associated with the first side 18 of housing 12 is used to select the alphabet character that is displayed on the keypad that is closest to the first shift key while the second shift key is used, in combination with a number key to select the alphabet character that is printed on the number key that is closest to the second shift key. For example, in FIG. 1 number key 2 selects alphabet characters A, B and C. First shift key 22 in combination with number key 2 would be used to select the letter C while second shift key 24 in combination with the number 2 key would be used to select letter A. This association of shift keys with alphabet characters on the typical telephone alphanumeric keypad makes text entry logical to the user.

TABLE 1

Continuous Activation Of Shift Key

| Key Continuously Activated | Key Activated | Letter Selected |
|---|---|---|
| SK1 | 2 | A |
|  | 3 | D |
|  | 4 | G |
| SK2 | 2 | C |
|  | 3 | F |
|  | 4 | I |
| None | 2 | B |
|  | 3 | E |
|  | 4 | H |

TABLE 2

Sequential Activation Of Shift/Number Keys

| 1st Key Activated | 2nd Key Activated | Letter Selected |
|---|---|---|
| SK1 | 2 | A |
| SK2 | 2 | C |
| 2 |  | B |
| SK1 | 3 | D |
| SK2 | 3 | F |
| 3 |  | E |
| SK1 | 4 | G |
| SK2 | 4 | I |
| 4 |  | H |

TABLE 3

Sequential Activation of Shift/Number Keys

| 1st Key Activated | 2nd Key Activated | Letter Selected |
|---|---|---|
| SK1 | 2 | A |
| SK2 | 2 | B |
| 2 |  | C |
| SK1 | 3 | D |
| SK2 | 3 | E |
| 3 |  | F |
| SK1 | 4 | G |
| SK2 | 4 | H |
| 4 |  | I |

TABLE 4

| 1st Key Activated | 2nd Key Activated | Letter Selected |
|---|---|---|
| 2 | SK1 | A |
| 2 | SK2 | C |
| 2 |  | B |
| 3 | SK1 | D |
| 3 | SK2 | F |
| 3 |  | E |
| 4 | SK1 | G |
| 4 | SK2 | I |
| 4 |  | H |

TABLE 5

| 1st Key Activated | 2nd Key Activated | Letter Selected |
|---|---|---|
| 2 | SK1 | A |
| 2 | SK2 | B |
| 2 |  | C |
| 3 | SK1 | D |
| 3 | SK2 | E |
| 3 |  | F |
| 4 | SK1 | G |
| 4 | SK2 | H |
| 4 |  | I |

The alphanumeric keypad depicted in FIG. 2 includes numbers 7 and 9 which are used to select four alphabet characters. The methods and apparatuses of this invention are also useful for designating four alphabet characters by activating three or fewer keys. Table 6 identifies activation sequence examples that are useful for designating the letter Q. In this Example the letters P, R and S are selected by activating the number 7 key followed by activation of either the first shift key, second shift key or by a single activation of the number 7 key alone. In Table 5, the letter Q can be selected with only two keystrokes if the asterisk and/or pound keys is used to select at least some of the alphabet characters associated with number 7 key or number 9 key or if the first and second shift keys (SK1 & SK2) are activated simultaneously.

TABLE 6

| 1st Key Activated | 2nd Key Activated/3rd Key Activated | Letter Selected |
|---|---|---|
| 7 | 7/7 | Q |
| 7 | SK2/SK2 | Q |
| 7 | SK1/SK1 | Q |
| 7 | # | Q |
| 7 | * | Q |
| 7 | 8 | Q |
| 7 | SK1/SK2 | Q |
| 7 | SK2/SK1 | Q |
| SK1/SK2 | 7 | Q |

The methods and key boards disclosed herein are applicable to a variety of uses including, but not limited to traditional mechanical keyboards and keypads such as those used in household telephones. The apparatuses and methods of this invention are particularly useful in conjunction with mobile and/or cellular telephones. The apparatuses of this invention may include keypads with discrete buttons or they may include touch screens having "soft" buttons or keys. With touch screens, key selections may be made with a fingertip or stylus. Touch screen keypads may comprise thin glass panels positioned over a CRT or LCD display (not shown). The display may be a capacitive screen, so that touching the screen perturbs the electric field between the glass panels, resulting in voltage changes (e.g., at the corners of the screen) corresponding to the distance between the screen's corners and the point of contact. With this information, circuitry (including one or more electronic components, such as a microprocessor) in communication with the keyboard can calculate the position of the touched portion of the display to thereby deduce which key was touched. Alternatively, the touch screen may be a resistive touch screen that includes two conductive coated layers separated by nonconductive spacer dots. When pressure is applied to the screen, the conductive layers are urged closer together, thus creating a flow of current between the two layers at the contact point, which is then reported to the circuitry in communication with the keypad so that the identity of the touched key can be ascertained.

In more traditional keypads or keyboards used with household phones and cell phones, the keys of the keypad may be interfaced with momentary contact push-button switches that in turn are connected to an electronic component such as a microprocessor that monitors the state of each switch. When the processor finds a circuit that is closed (i.e., when current flows through the circuit), the processor compares the location of that circuit to a table; such as Tables 1-6 above, and identifies the corresponding character.

In certain embodiments, electronic circuitry (such as a microprocessor) in communication with a keyboard or keypad includes a buffer into which is input the identity of selected keys. The circuitry then converts key sequences into the appropriate letter or symbol in accordance with the corresponding key selection sequence. The electronic circuitry may include software or hardware for making such conversions. The resulting selected letters or other characters identified by the electronic circuitry may be advantageously displayed on a display screen 26 and/or sent to a remote electronic device (e.g., over the public telephone network or via wireless techniques).

These inventions may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A mobile telephone comprising:
   a housing;
   a keypad located in the housing including a plurality of number keys wherein at least one number key is used to select at least three different characters;
   a display located in the housing;
   a first shift key; and
   a second shift key wherein one of the at least three different characters selectable with the at least one number key is selected by activating the at least one number key in combination with at least one key selected from the group of keys consisting of the first shift key and the second shift key wherein no more than two keys are activated to select each one of the at least three different characters, wherein the telephone includes no more than two shift keys and wherein the at least one key selected from the group of keys consisting of the first shift key and the second shift key is used exclusively in conjunction with the at least one number key for selecting characters, wherein one of the at least three characters is displayed by activating the at least one number key and the first shift key, and wherein the first shift key is activated before the number key is activated.

2. The mobile telephone of claim 1 wherein the first and second shift keys are pressure activated keys.

3. The mobile telephone of claim 1 wherein the first and second shift keys are touch sensitive keys.

4. The mobile telephone of claim 1 wherein the mobile telephone housing includes a first side and a second side wherein the first and second shift keys are on opposing sides of the housing.

5. The mobile telephone of claim 1 wherein the mobile telephone housing includes a first side and a second side wherein the first and second shift keys are each located on the same side of the housing.

6. The mobile telephone of claim 1 wherein the keypad includes a key for displaying each of the numbers 0 through 9.

7. The mobile telephone of claim 1 wherein the at least three characters selected by the at least one number key are alphabet characters.

8. The mobile telephone of claim 1 wherein the display displays the selected character.

9. A mobile telephone comprising:
   a housing;
   a keypad located in the housing including a plurality of number keys wherein at least one number key is used to select at least three different characters;
   a display located in the housing;
   a first shift key; and
   a second shift key wherein one of the at least three different characters selectable with the at least one number key is selected by activating the at least one number key in combination with at least one key selected from the group of keys consisting of the first shift key and the second shift key wherein no more than two keys are activated to select each one of the at least three different characters, wherein the telephone includes no more than two shift keys and wherein the at least one key selected from the group of keys consisting of the first shift key and the second shift key is used exclusively in conjunction with the at least one number key for selecting characters;
   wherein one of the at least three characters is displayed by activating the at least one number key and the first shift key, and wherein the number key is activated before the first shift key is activated.

10. A mobile telephone comprising:
    a housing;
    a keypad located in the housing including a plurality of number keys wherein at least one number key is used to select at least three different characters;
    a display located in the housing;
    a first shift key; and
    a second shift key wherein one of the at least three different characters selectable with the at least one number key is selected by activating the at least one number key in combination with at least one key selected from the group of keys consisting of the first shift key and the second shift key wherein no more than two keys are activated to select each one of the at least three different characters, wherein the telephone includes no more than two shift keys and wherein the at least one key selected from the group of keys consisting of the first shift key and the second shift key is used exclusively in conjunction with the at least one number key for selecting characters;
    wherein one of the at least three characters is displayed by activating the at least one number key and the first shift key, and wherein the first shift key is activated while the number key is activated.

11. A mobile telephone comprising:
a housing;
a keypad located in the housing including a plurality of number keys wherein at least one number key is used to select at least three different characters;
a display located in the housing;
a first shift key; and
a second shift key wherein one of the at least three different characters selectable with the at least one number key is selected by activating the at least one number key in combination with at least one key selected from the group of keys consisting of the first shift key and the second shift key wherein no more than two keys are activated to select each one of the at least three different characters, wherein the telephone includes no more than two shift keys and wherein the at least one key selected from the group of keys consisting of the first shift key and the second shift key is used exclusively in conjunction with the at least one number key for selecting characters;
wherein one of the at least three characters is displayed by activating the at least one number key and the first shift key, and wherein a second of the at least three characters is designated by activating the at least one number key and the second shift key.

12. The mobile telephone of claim 11 wherein a third of the at least three characters is displayed by activating only the at least one number key.

13. A method for selecting a non-numeric character comprising the step of:
providing a mobile phone that includes a housing, a keypad located in the housing including a plurality of number keys wherein at least one number key is used to select at least three different non-numeric characters, a display located in the housing a first shift key and a second shift key;
activating a number key;
activating one shift key selected from the first shift key and the second shift key to select one of the at least three different non-numeric characters; and
displaying the selected non-numeric character on the display wherein the non-numeric character is an alphabet character of from A to Z and wherein each alphabet character from A to Z is displayed by activating no more than two keys wherein the at least one key selected from the group of keys consisting of the first shift key and the second shift key is used exclusively in conjunction with the at least one number key for selecting all alphabet characters from A to Z;
wherein the mobile phone includes a first shift key and a second shift key; wherein the letters A, B and C can be selected with the number 2 key, and wherein the letters D, E and F can be selected with the number 3 key.

14. The method of claim 13 wherein the letter A is selected by activating the first shift key and the number 2 key in no particular order.

15. The method of claim 13 wherein the letter A is selected by activating the second shift key and the number 2 key in no particular order.

16. A method for selecting a non-numeric character comprising the steps of:
providing a mobile phone that includes a housing, a keypad located in the housing including a plurality of number keys wherein at least one number key is used to select at least three different non-numeric characters, a first shift key and a second shift key, and a display located in the housing;
activating a number key to select one of the at least three different non-numeric characters and activating the same number key and only one shift key in no particular order to select a second of the at least three different non-numeric characters; and
displaying the selected character on the display wherein only the number key and one shift key are activated to display the selected character, wherein the letters A, B and C can be selected with the number 2 key, wherein the letters D, E and F can be selected with the number 3 key wherein the letter A is selected by either activating the number 2 key or by activating a shift key selected from the first shift key and second shift key and by activating the number 2 key in no particular order and wherein the letter B is selected by activating the number 2 key or by activating a key selected from the first shift key and the second shift key and activating the number 2 key in no particular order and wherein the letter A and the letter B are selected by different key activation sequences;
wherein the letter C is selected by activating either the number 2 key or by activating a shift key selected from the first shift key and by activating the number 2 key in no particular order wherein the letters A, B and C are selected by different key activation sequences.

* * * * *